# United States Patent Office 3,503,291
Patented Mar. 31, 1970

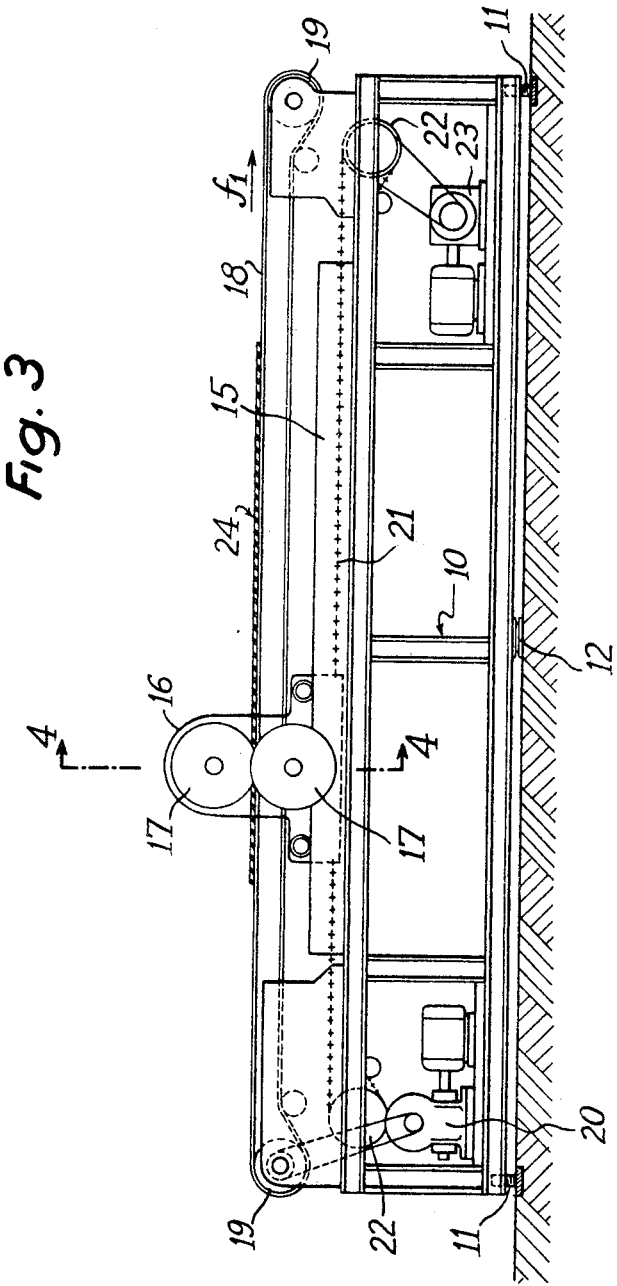

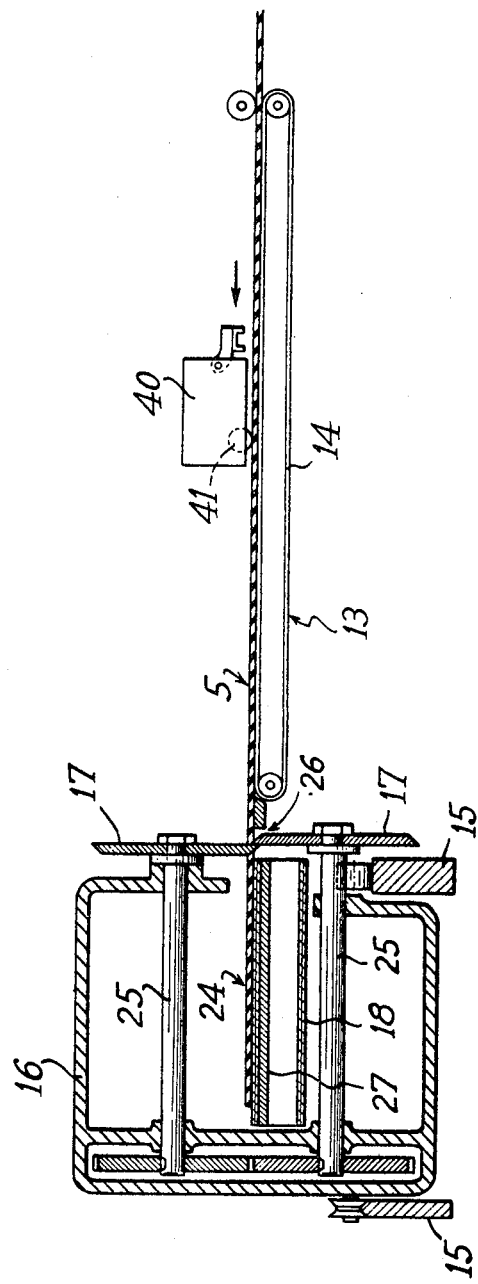

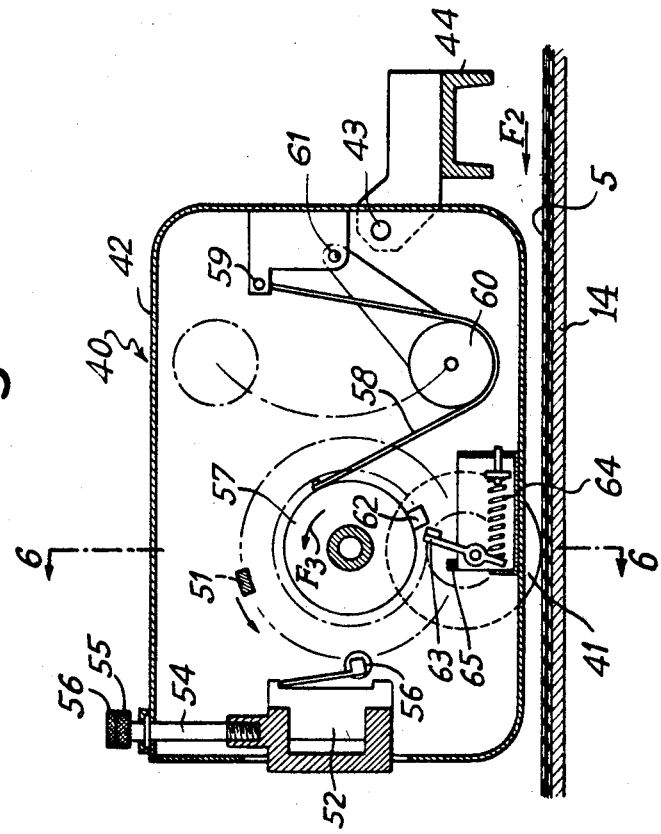

3,503,291
METHOD AND MACHINE FOR CUTTING RUBBERISED FABRIC
Jacques Pouilloux, St. Gratien, France, assignor to Pneumatiques Caoutchouc Manufacture et Plastiques Kleber-Colombes, Colombes, France, a corporation of France
Filed Mar. 27, 1967, Ser. No. 626,171
Claims priority, application France, Mar. 31, 1966, 55,900
Int. Cl. B26d *3/00, 5/20*
U.S. Cl. 83—42        8 Claims

ABSTRACT OF THE DISCLOSURE

The invention relates to a method of and apparatus for cutting rubberised fabric and the like by means of one or more rotary knives moving transversely of the fabric. The fabric is advanced after the end of each travel of the knives for successive unequal distances, the fabric being moved for the forward travel of the knives by a distance equal to the width of the strip to be cut plus twice the predetermined displacement from the theoretical cutting line and for the return travel of the knives the fabric is moved by a distance equal to the width of the strip to be cut minus twice said predetermined displacement.

---

Figure 1:
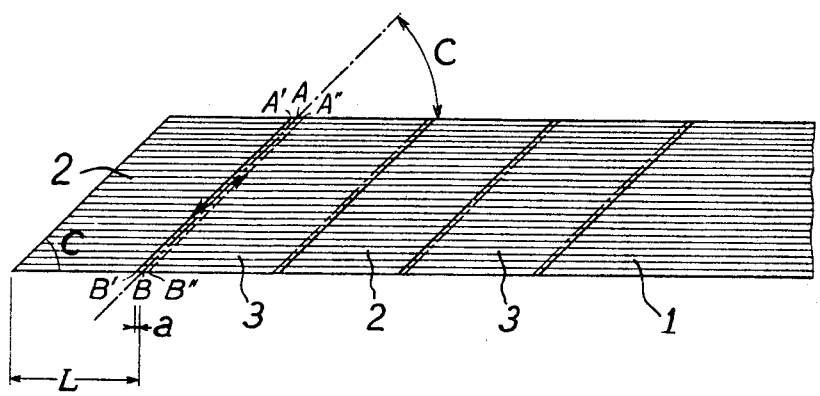

The present invention relates to improvements in machines used for cutting fabric coated with non-vulcanised rubber, known as "cord" fabric serving to reinforce tires and other rubber articles. More especially it relates to machines intended for cutting fabrics formed by cables made of metal or other relatively hard and stiff materials compared with fabrics formed by fine textile cables offering little resistance to shearing.

In the known machines used for this purpose, cutting is generally ensured either by means of two circular rotary knives, or by means of one circular knife acting against a fixed counter-blade, the knife or knives being mounted on a carriage which can move along a transverse support. This support is orientable in order to allow cutting on the bias along different angles with respect to the longitudinal direction of the cables constituting the fabric. In operation, the fabric is advanced step by step underneath this support in order to be cut into transverse strips.

It has been established, when using cutting devices of this type, that the fabric is not cut exactly along the theoretical cutting line situated in the plane of contact of the knives, but a little to one side of this line. If it is proposed for example to cut from a fabric a bias strip of certain angles and width, by displacing the knives along a theoretical cutting line, it is established by experiment that the fabric is, in fact, cut along a line parallel to the theoretical line and at a certain distance from this latter. This is explained by the fact that each cable of the fabric slides and bends slightly in front of the knives before being sectioned. This phenomenon is all the more substantial as the cables are hard and large and as the cutting angle is smaller. In certain cases, the displacement can attain several millimeters. This phenomenon is shown still more clearly when, after having moved the knives along the theoretical line, the knives are moved backwards without separating the knives and without advancing the fabric. In this case, the cables of the fabric bend in the other direction and cutting is effected along another line displaced to the other side of the theoretical line and a narrow cut strip is obtained whose width is substantially equal to twice the displacement times the sine of the angle of bias.

It is thus seen that, with the known machines with movable knives, it is practically impossible to move the knives backwards without separating them with the risk of uselessly cutting the fabric. Moreover, it is not possible, as would be desirable for increasing the efficiency of the machine, to make the knives operate in both directions of displacement, i.e. advance and return, by advancing the fabric underneath the knives between each travel by a certain distance, since as the displacement is produced sometimes on one side and sometimes on the other side of the theoretical cutting line, one would obtain successive strips which are alternately narrow and wide and this would not be admissible for the regularity and precision of manufacture. In practice, one is thus content to make the knives operate only in the advance direction and for the return there is provided a device for separating the knives, this having the disadvantage of complicating the machine.

The invention has for an object to remedy these disadvantages and consequently to produce a machine in which the cutting can be effected in both directions of displacement of the knives whilst producing cut strips of equal and precise widths.

The invention relates firstly to this end to a method consisting, in a cutting machine whose cutting means consist of one or more rotary knives moving transversely to the fabric to be cut, in advancing said fabric after the end of each travel of the knives over successive and equal distances, the advance of the fabric for the advance travel of the knives being equal to the value of the step corresponding to the width of the strip to be cut increased by twice the established shift, whilst the advance of the fabric for the return travel of the knife is equal to the value of this step produced by twice the established shift.

The invention also relates to a cutting device for carrying out the preceding method or a similar method of the type comprising one or more rotary knives moving transversely to the fabric to be cut and a device for controlling the advance movement of the fabric, said cutting device being characterised in that the control device controls the switching off of the system for advancing the fabric so as to determine advance movements which are successively unequal but alternately equal, means, moreover, being provided to adjust the difference between the successive advance movements as a function of the established shift so as to obtain cut strips of equal widths by making the knives operate in the two directions of their displacement.

Figure 2:
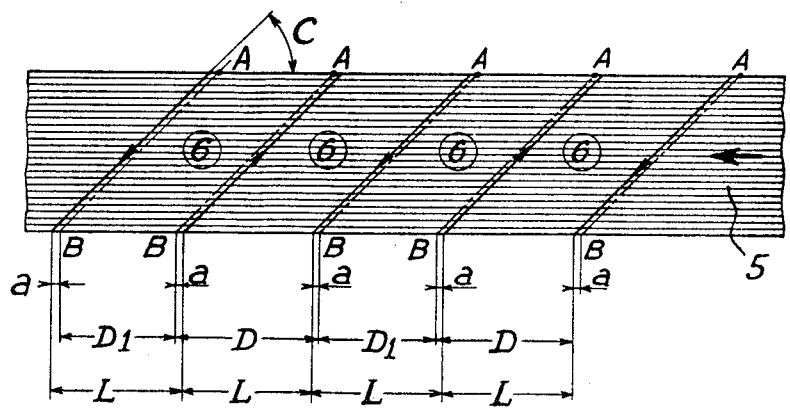

In order that the invention may be more clearly understood, reference will not be made to the accompanying drawings which show one embodiment thereof and a diagram of prior art cutting methods, and in which:

FIGURE 1 shows a diagram of prior art cutting methods,

FIGURE 2 is a schematic view illustrating the method according to the invention, FIGURE 3 is an elevational view of a cutting device of the type to which the invention is applied, FIGURE 4 is a part sectional view along the line 4—4 of FIGURE 3, and FIGURES 5 and 6 are elevational and side view of the device for controlling the advance of the fabric according to the invention, these views being cut repectively along lines 5—5 and 6—6.

Referring now to the drawings, FIGURE 1 shows a diagram of prior art cutting methods, wherein a bias strip 2 is to be cut from a fabric 1, the strip 2 having an angle C, the "angle of bias", and being of width L sin C. The theoretical cutting line is at A′B′ parallel to AB, the displacement being indicated by *a*. If the knives are moved backwards cutting is along another line B″A″ displaced to the other side of AB and the width of which is substantially equal to twice *a* sin C, as referred to above. Thus, also as refered to above, if the fabric 1 is advanced beneath the knives betwen each travel by the distance L, the displacement $a$ is produced to one side of AB on the forward stroke and to the other side of AB on the return stroke, so that successive strips are alternately narrow and wide as at 2 and 3.

FIGURE 2 schematically illustrates the method used according to the invention for obtaining, from a fabric 5 constituted by parallel longitudinal cables coated with a layer of rubber, strips 6 cut on the bias along an angle C and all of equal width L sin C, it being understood that the angle C can vary within wide limits, i.e. between 90° and small angles of the order of 15°.

First of all, at the end of the piece of fabric 5 one proceeds with an experimental cutting which will give the value of the displacement $a$ between the theoretical cutting line and the actual cutting line, this displacement being a function, as has already been indicated, of the nature and dimension of the cables of the fabric 5 and the cutting angle C. As the value of this displacement $a$ is then known, the fabric 5 is advanced longitudinally in order to guide it beneath the path of the knives. For the advance travel AB of operation of the knives, this advance movement will be determined by the formula $D=L+2a$ whilst for the return travel BA of operation of the knives, the advance will be $D_1=L-2a$. The advance steps D and $D_1$ of the fabric are thus succesively unequal and alternately equal, the difference between two successive steps being substantially equal to four time the displacement $a$ established during the preliminary experiment.

The coupling device for carrying out this method comprises, in a manner known per se, a frame 10 of elongated shape carried at each end by rollers 11 and at the centre by a bearing 12 so as to be able to pivot about a vertical axis in order to adjust the angle of cut of the fabric. This fabric 5 is guided to the cutting device by a table 13 which is placed upstream with respect to FIGURE 3 and which can, in particular, be constituted by an endless belt or by a series of parallel endless belts as shown schematically at 14 in FIGURE 4.

The frame 10 carries two parallel rails such as 15 on which there may be horizontally displaced a carriage 16 carrying the knives 17 and in its upper part, a conveyor 18 constituted by an endless belt serving to receive and carry off the cut strip of fabric 24. The belt of the conveyor 18 is wound on two rollers 19 placed at each end of the frame. One of these rollers is driven by a motor unit 20 having a reduction gearing and controlled by the operator or automatically when the carriage 16 arrives at the end of its travel.

The carriage 16 is itself connected to the ends of a chain 21 which is wound on return pinions 22, one of which is driven alternately in one direction and the other from a motor unit 23 with reduction gearing, which motor may be controlled manually to automatically. The carriage is in the general shape of a swan's neck or a letter C so as to allow the passage to the two horizontal ends of the discharge conveyor 18 (FIGURE 4).

In the two examples shown, the fabric 5 is cut by means of two circular knives 17 mounted at the end of two parallel horizontal shafts 25 in alignment along a vertical plane and rotating in bearings of the frame of the carriage 17. The distance between the two shafts 25 is slightly shorter than the diameter of the knives 17 and at least one of the shafts is urged axially in order that the knives are in contact with one another along one of their vertical faces in the narrow gap 26 between the front transverse edge of the lead-in table 13 and a longitudinal edge of the discharge conveyor 18. The upper end of the conveyor 18 is held by a support plate 27 at the level of and in line with the table 13. As a modification, the fabric could be cut by a single circular knife such as 17 or even by an assembly constituted by a single circular knife 17 acting upon a fixed counter-blade extending longitudinally in the gap 26 in place of the lower knife. In the two cases, the single circular knife is carried by the carriage 16. Whatever cutting device is used, the operation remains substantially the same. The fabric 5 guided onto the table 13 is advanced above the conveyor 18 whilst the carriage 16 is at one end of its travel and whilst the conveyor 18 is stationary. Then the displacement of the carriage 16 is controlled in order to cut the fabric in the gap 26 whereafter the conveyor 18 is set into operation in order to carry the strip of cut fabric 24 away towards $f_1$. As the carriage 16 is still at the end of the advance travel, the fabric 5 is in advance by a distance $D_1$ above the conveyor 18 which has been stopped, then the carriage 16 is returned rearwardly in order to cut a new strip 24 which will also be discharged towards $f_1$ for the conveyor 18.

The advance movement of the fabric 5 over the table 13 is ensured by the belt or the belts 14 are driven by an electrical motor (not shown in the drawing). This advance movement is controlled by a device indicated at 40 in FIGURE 4 which comprises a knurled roller 41 which is driven by rolling over the fabric 5. This device controls the switching off of the motor driving the belt 14 when the fabric has advanced by a step $D_1$ or D according to whether the carriage will have moved in the advance or return direction. This control device is shown in detail in FIGURES 5 and 6. It comprises a casing 42 rearwardly mounted on a horizontal transverse shaft 43 carried by a cross piece 44 so as to be able to be removed in order that the fabric 5 can be placed in position on the lead-in table 13. The roller 41 is situated towards the front in order to be applied onto the fabric by the weight of the device. This roller is secured to a shaft connected to rotate with another transverse shaft 46, by means of a pair of pinions 45 to the end of which shaft 46 is freely engaged in a sleeve 47. The shaft 46 carries to rotate therewith an element 48 of an electromagnetic clutch, the other element 49 of this clutch being mounted to slide at the end of the sleeve 47. The external end of the sleeve 47 rotates in a side wall of the casing 42 and it carries an interchangeable and adjustable cam disc 50. This cam has a lift 51 penetrating into the casing through a slot in the wall. On the front wall of the casing 42 there are mounted two contactors 52 and 53 whose heights are adjustable independently of one another by means of fine thread screws 54–55. Each of these contactors comprises a roller such as 56 whose end is situated on the path described by the lift 51 of the cam 50. The contactors are electrically connected to the circuits of the electrical motor for driving the belt 14 for advancing the fabric 5.

The sleeve 47 furthermore carries a wheel 57 on which is attached a small chain 58 connected at its other end to a fixed point 59 of the casing. This chain 58 supports a counter-weight 60 oscillating about an axis 61. The wheel 57 of the sleeve furthermore comprises a stop catch 62 which abuts on a stop 63 constituted by a small oscillating lever subjected to the action of a compression spring 64 enabling it to move back as far as a fixed stop 65.

The above described device operates in the following manner. In rest position, the electromagnetic clutch 48–49 is not energised so that the sleeve 47 is free to rotate with respect to the axis 46. The counter-weight 60 has thus returned this sleeve into its initial position by bringing the catch 62 of the wheel 57 in contact with the stop 63. The action of the counter-weight 60 is insufficient for causing the stop 63 to move back against the action of its spring 64. The cam 50 is mounted at the end of the sleeve 47, the lift 51 of said cam being at a predetermined position for a certain cutting angle C. In addition, this cam 50 is given, during assembly, an initial position with respect to the sleeve 47 whch is variable according to the width of the strips 24 to be cut. This adjustment of the initial position of the cam 50 can be obtained, for example, by inserting between the cam 50 and the sleeve 47 an arm or sector 66 pierced with a plurality of series of holes 67 in the manner of divider plates. The cam is secured to the arm 66 by means of a pin 68 engaged in one of the holes 67 and in a corresponding hole of the cam 50 (FIGURE 6).

In order to advance the fabric 5 underneath the knives 17 the operator actuates a contact which controls the motor driving the belt 14. The belt and the fabric 5 advance in the direction of the arrow F2 by rotating the roller 14 in contact with the fabric 5. At the same time, the clutch 48–49 is energised in order to couple the axis 46 and the sleeve 47 so that the wheel 57 and the cam 50 rotate together according to the arrow F3 until the lift 51 of the cam actuates the rollers 56 of the contactors 52 and 53.

As these contactors are established so as to operate alternately, only one of them, for example, contactor 52, corresponding to the advance travel of operation of the knives 17, will control the stopping of the motor driving the belt 14 and will stop the advance movement of the fabric 5. The length of fabric thus advanced between switching on the motor and the stop controlled by the contactor 52 thus corresponds to the value of the advance step of the fabric. This value is adjusted to the value D corresponding to the desired width for the strip of fabric 24, by acting on the adjustment screw 54 which enables the position of the roller 56 to be adjusted on the path of the lift 51 of the cam. As soon as the motor has stopped, the clutch 48–49 is de-energised and the cam 50 returns into its initial position under the action of the counter-weight 60. In the following cycle, the contactor 52 does not operate and only the contactor 53 will control the stopping of the advance movement of the fabric after an advance step $D_1$ immediately preceding the "return" travel of operation of the knives 17. This step $D_1$ is also adjusted by means of the adjustment screw 55 of the contactor 53.

It is thus seen that with this device the successive advance steps of the fabric can be regulated precisely and to unequal values, as to take into account the displacements established between the theoretical cutting line and the actual cutting line, not only during the advance travel but also during the return travel of the knives. Cut strips 24 of uniform width can thus be obtained despite this displacement. The most advantageous practical consequence is to be able to make the knives operate for the advance and return movement and consequently to increase the capacity of production of the machine.

The possibility of moving the stop 63 back is used when a fabric of an adhesive nature is dealt with which, when it becomes stationary and upon cutting, adheres to the front edges of the table 13 to the point of opposing or hindering a new advance movement of the fabric. A suitable means of unsticking the fabric from the front edge of the table 13 consists in drawing it slightly rearwardly before making it advance again. When such a manoeuvre is effected by actuating the motor of the belt 14 in reverse direction, the roller 41 drives the wheel 57 rearwardly (i.e. in direction opposite F3), the catch 62 of this wheel causing the stop 63 to move back against the action of its spring 64. The cam 50 which rotates with the wheel 57 follows this back movement of the stop 63 so that the backward movement of the fabric is in some way discounted without altering the adjustment of the advance movement which has been given by means of the screws 54 and 55 of the contactors.

I claim:

1. A method of cutting equal lengths from a rubberised fabric being advanced in successive longitudinal steps, particularly fabric including longitudinal metal cables serving to reinforce tyres and other rubber articles, by cutting means consisting in one or more rotary knives which make alternate forward and return traverses which can be respectively at acute and supplementary obtuse angles with the direction of advance of said fabric, said method consisting in effecting cuts on both the forward and the return traverses of the knives, advancing the fabric after the end of each said traverse, adjusting the advance of the fabric for the forward traverse of the knives so that said step is equal to said length increased by twice a predetermined displacement, and adjusting the advance of the fabric for the return traverse of the knives so that said step is equal to said length reduced by twice said displacement.

2. Apparatus for cutting equal lengths from a rubberised fabric including longitudinal metal cables, comprising means for advancing said fabric in successive longitudinal steps, rotary cutting means arranged to make alternate forward and return cutting traverses along a horizontal path only respectively at acute and supplementary obtuse angles with the direction of advance of said fabric, and control means for said fabric advance which adjust said steps to be successively unequal but alternately equal, and differing from said length by twice a predetermined displacement alternately positive and negative, said control means comprising a roller driven by the fabric and which actuates two different contactors alternately controlling the stopping of the fabric advancing means, one after a short step, the other after a long step.

3. Cutting apparatus according to claim 2, wherein the roller drives a cam acting on said contactors.

4. Cutting apparatus according to claim 3, wherein said two contactors are adjustable independently of one another with respect to said cam which actuates them.

5. Cutting apparatus according to claim 3, wherein said cam is interchangeable with similar cams whose profile corresponds to different cutting angles.

6. Cutting apparatus according to claim 3, wherein a gear system is inserted between said roller and said cam in order to enable the cam to be returned into its initial position every time the fabric advancing device stops.

7. Cutting apparatus according to claim 3, wherein a device for adjusting the initial position of the cam is provided to permit said length to be adjusted.

8. Cutting apparatus according to claim 3, wherein the initial position of said cam is determined by a stop which is resiliently movable rearwardly in order to permit a slight rearward return of the fabric, the correction of the advance movement to be effected, thus being automatically and accurately effected.

References Cited

UNITED STATES PATENTS

| | | | |
|---|---|---|---|
| 2,539,240 | 1/1951 | Firestone | 83—56 XR |
| 2,544,241 | 3/1951 | Sternad et al. | 83—209 XR |
| 2,733,766 | 2/1956 | Wikle | 83—210 XR |
| 2,738,007 | 3/1956 | Power et al. | 83—209 |

LEONIDAS VLACHOS, Primary Examiner

U.S. Cl. X.R.

83—56, 209, 238, 578